F. E. STANLEY.
WATER LEVEL INDICATOR.
APPLICATION FILED JULY 18, 1907.
1,123,611.
Patented Jan. 5, 1915.
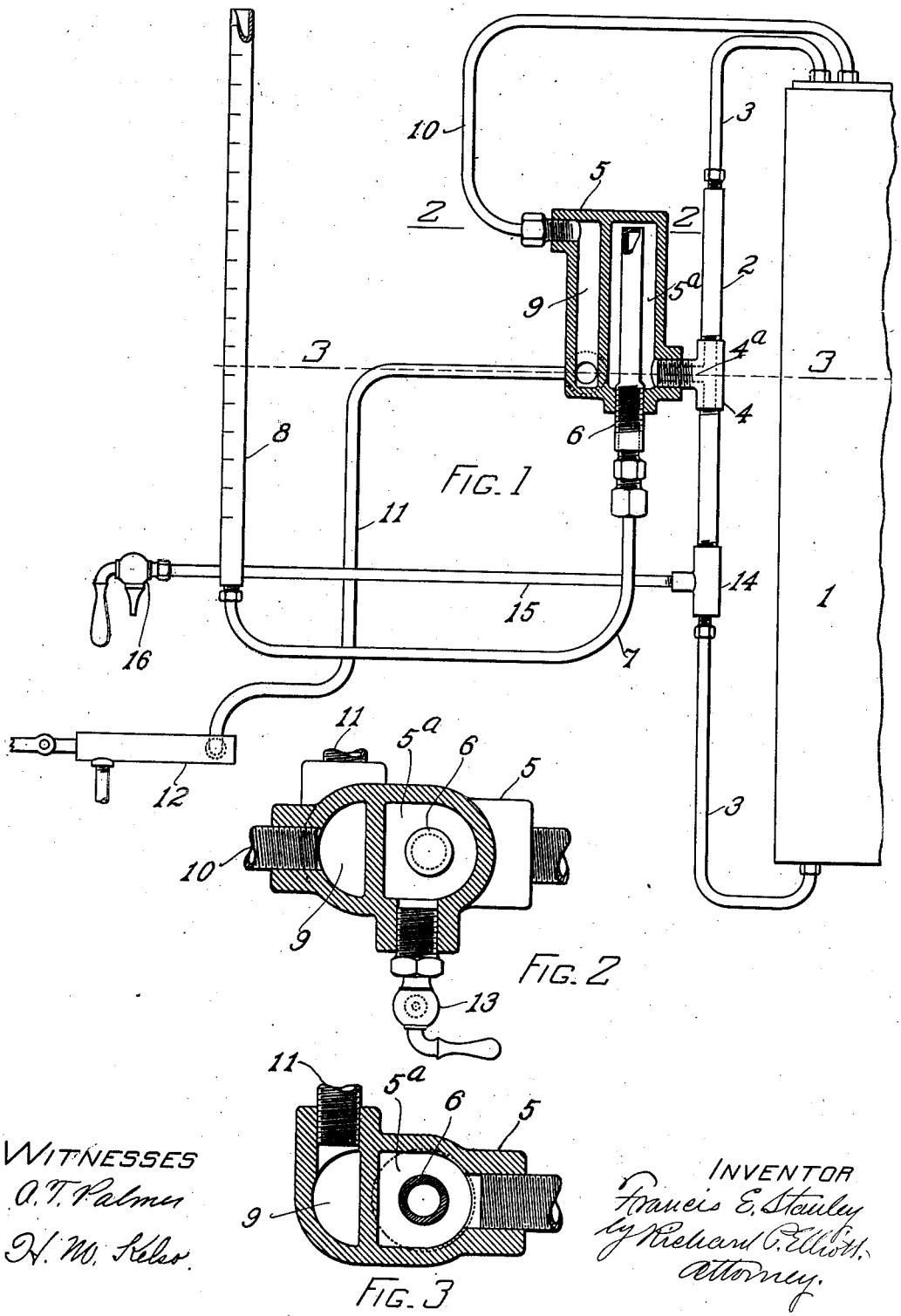

UNITED STATES PATENT OFFICE.

FRANCIS E. STANLEY, OF NEWTON, MASSACHUSETTS.

WATER-LEVEL INDICATOR.

1,123,611.　　Specification of Letters Patent.　　Patented Jan. 5, 1915.

Application filed July 18, 1907. Serial No. 384,378.

*To all whom it may concern:*

Be it known that I, FRANCIS E. STANLEY, a citizen of the United States, residing at Newton, in the county of Middlesex and State of Massachusetts, have invented certain new and useful Improvements in Water-Level Indicators, of which the following is a specification, reference being had to the drawings accompanying same.

My invention relates to a water level indicator wherein the level of the water in a boiler is indicated by the rise and fall of liquid in a tube or other receptacle, or by the pointer of a pressure gage.

The object of my invention is to provide means that will indicate whether the water level in a boiler stands above or below a predetermined point.

A further object of my invention is to provide means that will indicate whether or no the level of water in a boiler is above or below a predetermined point without subjecting the indicating means to the pressure generated in the boiler.

In the drawings accompanying this specification—Figure 1 is a diagrammatic view of my water level indicating means and one method of attaching the same to a steam boiler. Fig. 2 is a sectional view of a portion of my water level indicating means taken on line 2—2, Fig. 1. Fig. 3 is a cross section of a portion of my water level indicating means taken on line 3—3, Fig. 1.

In the drawings accompanying and forming a part of this specification, 1 represents a section of a boiler taken in elevation, and 2 a water column connected with the top and bottom of the boiler by the pipes 3, 3. The middle portion of the water column contains a T 4 to which is attached the water level indicator 5. The water level indicator 5 is hollow and has two chambers 5$^a$ and 9. The chamber 5$^a$ has secured in its lower end a hollow tube 6 which is closed at its upper end, its lower end being connected to the pipe 7. The pipe 7 has attached to its outer end a hollow tube 8 which may or may not have spacings on it, as desired; or said pipe may be attached to a pressure gage as shown in dotted lines. The tube 8 is open at its upper end and when the device is in operation, water or other liquid is poured into its upper end until it fills the pipe 7 and the hollow tube 6 to its top.

9 represents a chamber in the body of the water level indicator 5 through which the feed-water passes when fed to the boiler. The upper end of the chamber 9 is connected to the pipe 10 which leads to the top of the boiler 1. The lower end of said chamber is connected at its side with the pipe 11 which in turn is connected with any suitable pump as 12. The chamber 9 and the pipes 10 and 11 are designed to conduct the feed-water to the boiler from the pump 12. The purpose of leading the feed water through the space 9 is to cool the body of the indicator 5 and condense any steam that may be contained in the space 5$^a$ when the water level in the boiler is above the outlet 4$^a$. The body of the indicator 5 is provided with a drain-cock 13 which may be used to free the chamber 5$^a$ from any air that it may contain.

14 is a T made into the water-column 2 at a point below the middle of the boiler and is connected to the drain-cock 16 by a pipe 15. The purpose of the T 14, pipe 15 and drain-cock is to ascertain when the water level in the boiler is above or below the location of the T 14.

The operation of my improved water level indicator is as follows:—When the water level in the boiler reaches a point below the inlet 4$^a$ of the T 4 the live or superheated steam from the boiler will enter the space 5$^a$, heat the liquid contained in the tube 6, expand it or evaporate it into steam, and cause it to rise in the tube 8 to a point equal to the amount of expansion in the tube 6, and indicate that the level of the water in the boiler is below the inlet 4$^a$ of the T 4. On the other hand, when the level of water is above the inlet 4$^a$ any steam that may be in the chamber 5$^a$ will be condensed by reason of the rise of water in the boiler and the flow of water through the chamber 9 and the pipes 10 and 11 from the pump 12, and in turn will condense the steam in the tube 6, thus contracting it, causing the liquid in the tube 8 to fall therein to indicate to the operator that the water level in the boiler is above said inlet 4$^a$.

It will be understood from the foregoing description that the water level indicator does not indicate just how far above or below the inlet 4$^a$ the water level in the boiler stands, but does indicate whether or not the water level is above or below said outlet, and this by the expansion or contraction of the liquid in the closed end tube 6 in the chamber 5ª, the liquid in which tube communicates with a tube or pressure gage not subjected to the boiler pressure.

I have illustrated the best embodiment of my invention now known to me and have described its construction and operation; but desire to have it understood that the apparatus shown is only illustrative, and that the form and arrangement of the different parts may be changed in practising my invention, without departing from it.

What I claim is—

In a water level indicator, the combination of a casting having two chambers located side by side, formed therein, one of said chambers being a steam-chamber having a port at one side near its bottom, the other of said chambers being a water-chamber, having an inlet near its bottom and an outlet near the top communicating with the feed-pump and the boiler respectively; with a water-column communicating with said port in the steam-chamber, and extending the length of the vertical height of the boiler and communicating with the top and bottom thereof, a tube secured in the bottom of the steam-chamber and extending upwardly therein and closed at its upper end; a pipe secured to the lower end of said tube and an open end glass tube secured to said pipe.

In testimony whereof, I have hereunto set my hand, in the presence of two subscribing witnesses, this the 6th day of July, A. D. 1907.

FRANCIS E. STANLEY.

Witnesses:
E. E. WALKER,
F. J. MAURER.